United States Patent [19]

Abe

[11] Patent Number: 5,224,299
[45] Date of Patent: Jul. 6, 1993

[54] VEHICULAR DOOR STRUCTURE

[75] Inventor: Nobuo Abe, Kanagawa, Japan

[73] Assignee: Ikeda Bussan Co., Ltd., Ayase, Japan

[21] Appl. No.: 833,037

[22] Filed: Feb. 10, 1992

[30] Foreign Application Priority Data

Feb. 27, 1991 [JP] Japan .................. 3-15906[U]

[51] Int. Cl.$^5$ ............................................. B60J 5/04
[52] U.S. Cl. ........................................ 49/502; 296/39.1;
296/146 D; 428/160
[58] Field of Search ............. 49/502; 296/146 D, 39.1;
428/159, 160

[56] References Cited

U.S. PATENT DOCUMENTS

| 4,347,276 | 8/1982 | Weber | 428/160 |
| 4,459,331 | 7/1984 | Brix et al. | 428/71 |
| 5,040,335 | 8/1991 | Grimes | 49/502 |
| 5,048,234 | 9/1991 | Lau et al. | 49/502 |
| 5,111,619 | 5/1992 | Billin et al. | 49/502 |

FOREIGN PATENT DOCUMENTS

| 1025408 | 4/1966 | United Kingdom . |
| 1189810 | 4/1970 | United Kingdom . |
| 2001277 | 1/1979 | United Kingdom . |
| 1558249 | 12/1979 | United Kingdom . |
| 2074515 | 11/1981 | United Kingdom . |

Primary Examiner—Philip C. Kannan
Attorney, Agent, or Firm—Foley & Lardner

[57] ABSTRACT

A vehicular door structure includes a door panel and a door trim which is fixed to the door panel. The door trim includes a foamed pad member, an outer skin member for covering the foamed pad member, and a framework for reinforcing the door trim. The framework is substantially embedded in the foamed pad member. The framework is supported by a plurality of supporting brackets which are fixed to the door panel, thereby fixing the door trim to the door panel. The door trim is made light in weight, and the vehicular door structure is made easy to be assembled.

4 Claims, 3 Drawing Sheets

VEHICULAR DOOR STRUCTURE

BACKGROUND OF THE INVENTION

1. Field of the Invention

The present invention relates in general to a vehicular door structure, and more particularly, to a vehicular door structure having on the inboard side thereof a door trim.

2. Description of the Prior Art

In order to clarify the task of the present invention, one conventional vehicular door structure of the above-mentioned type will be described with reference to FIGS. 7 and 8.

Referring to FIG. 7, a vehicular door comprises a door panel (not shown) which is made of metal, and a door trim 10 which is fixed to the door panel. The door trim 10 comprises a substrate 12 which is fixed to the inboard surface of the door panel, and an outer skin member 14 covering the substrate 12.

As the substrate 12, a hard synthetic-resin board having a satisfactory strength is used. As the outer skin member 14, a sheet of soft synthetic resin or the like is used. The outer skin member 14 is attached to the inboard surface of the substrate 12 through adhesion, welding or the like.

As is seen from FIG. 8, there are provided, for example, a plurality of brackets 16 (only one is shown) and a plurality of pins 18 (only one is shown) for fixing the door trim 10 to the door panel. The bracket 16 which has a generally channel structure comprises two base wall portions 16a, two side wall portions 16b each extending from the inner ends of the base wall portions 16a, and an apertured wall portion 16c which is united with the side wall portions. The apertured wall portion 16c parallel to the base wall portions 16a has a circular opening 16d for receiving therein the pin 18, and a passage 16e for guiding the pin 18 to the circular opening 16d. The bracket 16 is fixed at middle portions 16f of the base wall portions 16a to the outboard surface of the substrate 12 of the door trim 10 through ultrasonic welding or the like.

The pin 18 comprises two disklike portions 18a which are parallel to and spaced from each other, a tapered end portion 18b which is spaced from the disklike portions 18a, and a stem portion 18c by which the disklike portions 18a and the tapered end portion 18b are united with each other.

The pin 18 is fixed to the bracket 16 with no play therebetween in such a manner that the stem portion 18c is passed through the circular opening 16d of the bracket 16, and that the apertured wall portion 16c is tightly sandwiched between the disklike portions 18a of the pin 18.

The door panel has a plurality of holes (not shown) at its inboard surface for receiving therein the tapered end portions of the pins 18.

For tightly fixing the door trim 10 to the door panel, the door trim 10 is pressed against the door panel in such a manner that the tapered end portions 18b of the pins 18 are thrust into the holes of the door panel. With this, the apertured wall portions 16c of the brackets 16 are in abutment with the door panel, and the door trim 10 is tightly fixed to the door panel.

However, the above-mentioned conventional door structure has the following drawbacks.

To make the substrate 12 have a satisfactory strength for reinforcing the door trim 10, it must have a certain thickness. However, this makes the substrate and the door trim undesirably heavy in weight.

Since the substrate 12 made of a hard material is covered by the outer skin member 14 which is thin, the door trim 10 becomes uncomfortably hard for seat occupants.

Since the brackets 16 are to be fixed to the door trim 10 and the pins 18 are to be fixed to the brackets 16, an assembly for producing a vehicular door becomes relatively complicated. This increases the production cost for producing the vehicular door.

SUMMARY OF THE INVENTION

It is therefore an object of the present invention to provide a vehicular door structure which is light in weight and which has a satisfactory strength.

It is another object of the present invention to provide a vehicular door structure which is simple in construction and which can be assembled by relatively simple steps.

According to the present invention, there is provided a vehicular door structure including: a door panel; a door trim which is to be fixed to the door panel, the door trim including a foamed pad member, an outer skin member for covering the foamed pad member and a framework for reinforcing the door trim, the framework being substantially embedded in the foamed pad member; and means for fixing the door trim to the door panel.

DESCRIPTION OF THE PREFERRED EMBODIMENTS

Referring to FIGS. 1 to 5, there is shown a vehicular door structure having on the inboard side thereof a door trim 20, in accordance with the first embodiment of the present invention.

Figure 1:
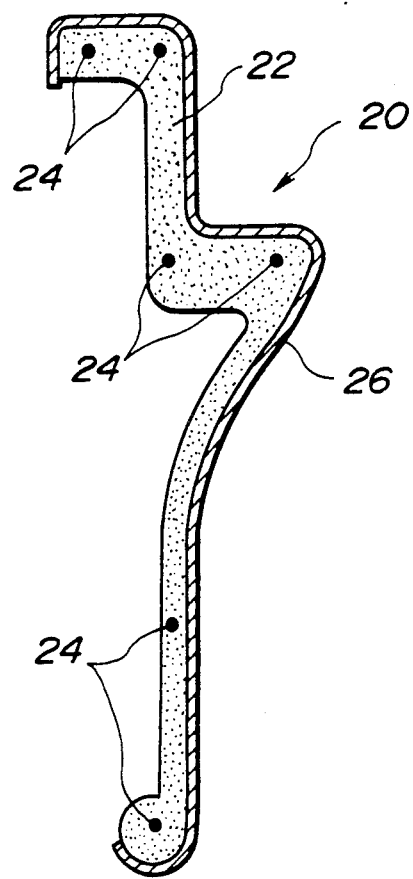
FIG. 1 is an enlarged sectional view of a door trim in accordance with a first embodiment of the present invention, which view is taken along a line perpendicular to a longitudinal axis of the door trim.

As is seen from FIG. 1, a door trim 20 comprises a foamed pad member 22, a framework 24 which is substantially embedded in the foamed pad member 22, and an outer skin member 26 for covering the inboard surface of the foamed pad member 22.

As material for the outer skin member 26, for example, a sheet of thermoplastic resin, a laminated sheet including a layer of thermoplastic resin and a layer of fabric, or the like is usually used. The foamed pad member 22 is made of foamed polyurethane or the like.

Figure 2:
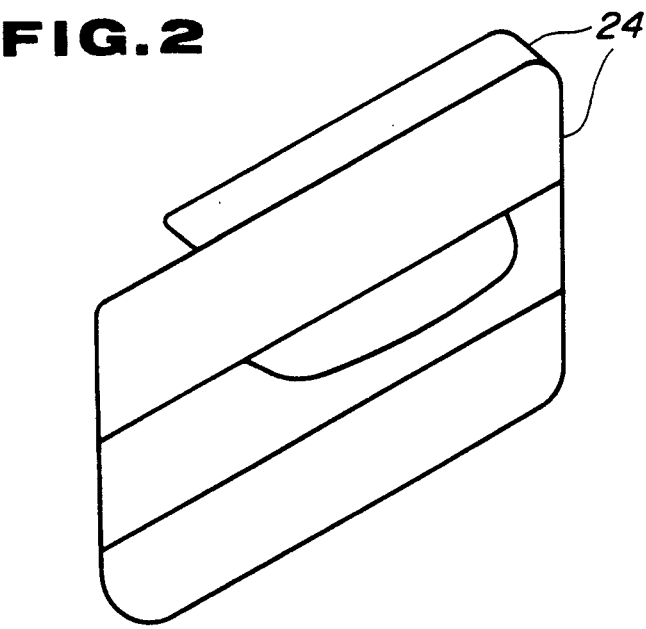
FIG. 2 is a perspective view of a framework of the door trim, the framework being to be embedded in a foamed pad member of the door trim.

As is seen from FIG. 2, the framework 24 is made of a plurality of metal wires such as steel wires. The framework 24 serves as a core structure or a skeletal structure of the door trim 20, thereby reinforcing the door trim 20. For producing the framework 24 which has a predetermined size and shape, straight metal wires are bent and connected to each other at certain positions through welding or the like.

In the present invention, the following steps are taken for producing the door trim 20.

A so-called "monobloc molding method" is employed for molding the framework-embedded door trim 20.

In this method, a mold assembly (not shown) comprising a lower mold and an upper mold is prepared. Then, the outer skin member 26 is put into a cavity of the lower mold. Then, by application of vacuum, the heated outer skin member 26 is stuck to a configured inside surface of the lower mold, thereby shaping the outer skin member 26, the inside surface defining the cavity. Then, the framework 24 is detachably attached to the upper mold. Then, the upper mold is put on the lower mold in such a manner that the cavity is sealed, and that the framework is located at a predetermined position in the cavity. Then, a foamable plastic material such as a material for foamed polyurethane or the like is poured into the cavity through an inlet opening formed in the upper mold. When the material is hardened to a certain level, the upper mold is removed from the lower mold. Then, the framework 24 is detached from the upper mold for releasing the product, viz., the framework-embedded door trim, from the lower mold.

Figure 3:
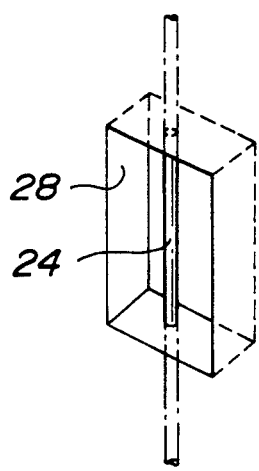
FIG. 3 is an enlarged perspective and partial view of the door trim, showing a condition in which a supported portion of the framework is exposed through a rectangular notch formed in the foamed pad member of the door trim.

As is seen from FIG. 3, for the purpose which will be clarified hereinafter, there are provided on the outboard side of the foamed pad member 22 a plurality of rectangular notches 28 for exposing a plurality of supported portions (no numerals) of the framework 24.

Figure 4:
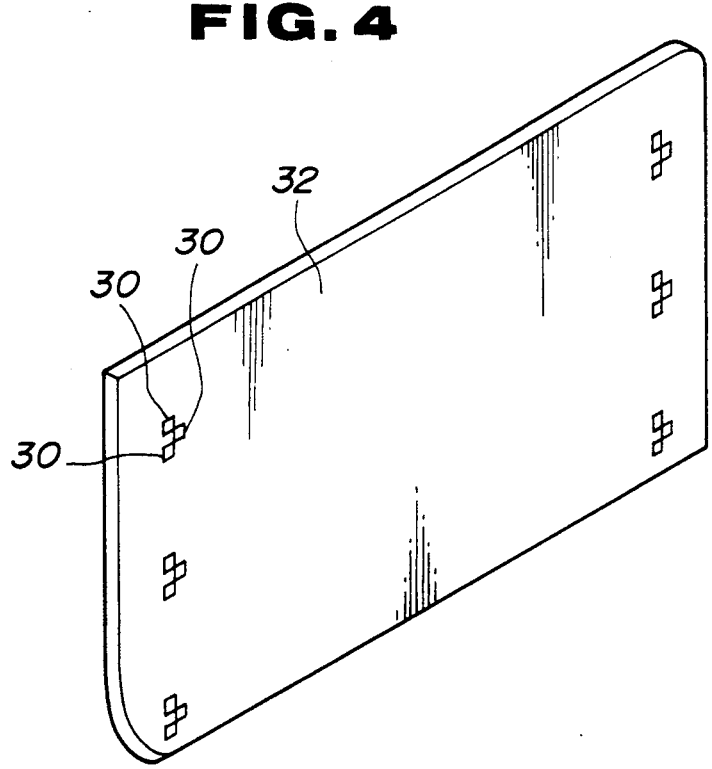
FIG. 4 is a perspective and schematic view of a door panel on which a plurality of supporting brackets are fixed, in accordance with the first embodiment.

As is seen from FIG. 4, a plurality of supporting brackets 30 are fixed to longitudinally opposed side portions of the inboard surface of a door panel 32.

Figure 5:
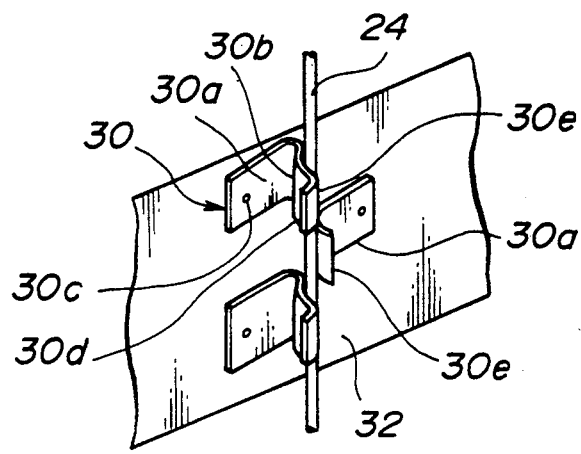
FIG. 5 is an enlarged partial view, showing a condition in which the supported portion of the framework is engaged with the supporting brackets, in accordance with the first embodiment.

As is seen from FIG. 5, each bracket 30 made of a metal plate comprises a flat portion 30a and a corrugated portion 30b which is substantially perpendicular to the flat portion 30a. The bracket 30 is fixed at its flat portion 30a to the door panel 32 through a common bolt (not shown) passing through a through opening 30c formed in the flat portion 30a.

Each three of supporting brackets 30 constituting a unit are arranged to be adjacent to each other and to be alternately positioned on one and the other sides of the supported portion of the framework 24, as illustrated, thereby tightly supporting the framework 24 with no play therebetween. As will be clarified hereinafter, the number of the unit is the same as that of the rectangular notches 28. The corrugated portion 30b of the bracket 30 comprises a middle curved portion 30d and an end curved portion 30e which is resilient. The middle curved portion 30d is so shaped as to be fitly engaged with the supported portion of the framework 24. The end curved portion 30e extends outward so as to guide the supported portion of the framework 24 into the middle curved portion 30d.

For fixing the door trim 20 to the door panel 32, the door trim 20 is pressed against the door panel 32 in such a manner that each supported portion of the framework 24 is pressed against the end curved portions 30e of the supporting brackets 30, thereby forcing the end curved portions 30e to bend outward and resiliently and forcing the supported portion to fitly engage with the middle curved portions 30d of the brackets 30 in a snap action manner. With this, each three supporting brackets 30 are received in the rectangular notch 28. Thus, the door trim 20 is fixedly secured to the door panel 32.

Figure 6:
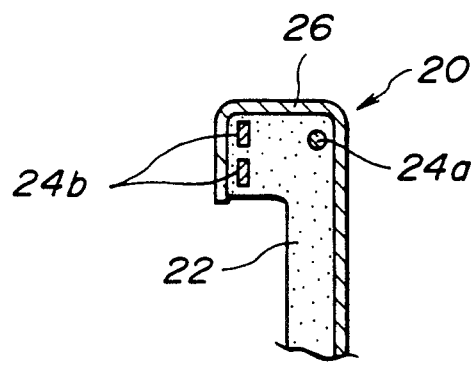
FIG. 6 is a view similar to FIG. 1, but showing a door trim according to a second embodiment.
Figure 7:
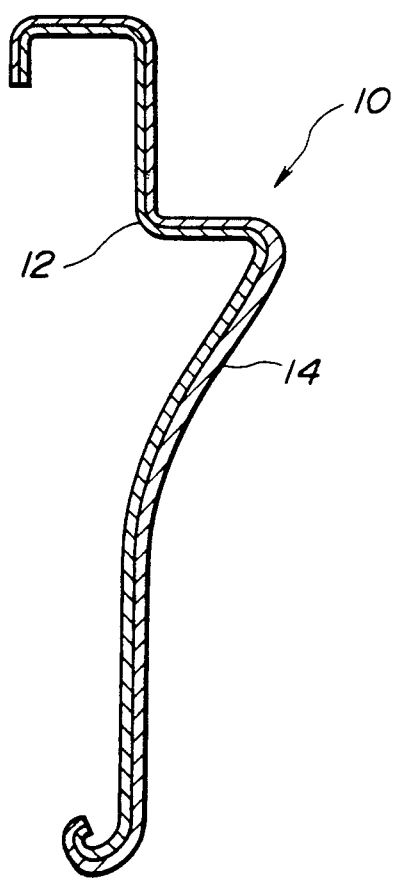
FIG. 7 is a view similar to FIG. 1, but showing a conventional door trim.
Figure 8:
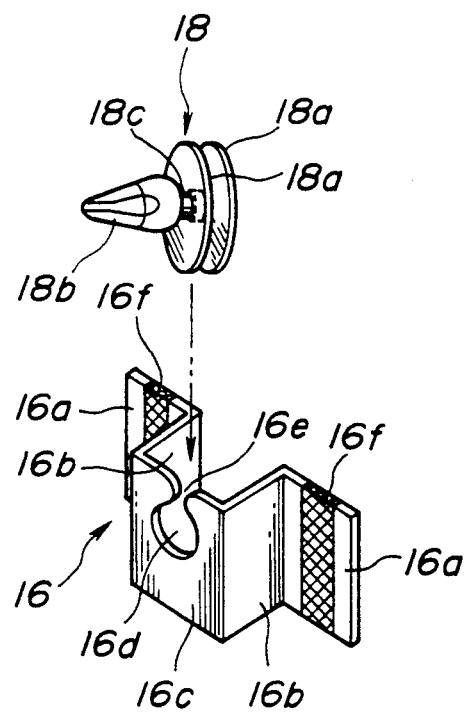
FIG. 8 is an enlarged perspective view, showing a bracket and a pin which are provided for fixing the conventional door trim to a door panel.

Referring to FIG. 6, there is shown a vehicular door structure having on the inboard side thereof a door trim, in accordance with a second embodiment of the present invention.

Parts substantially the same as those of the abovementioned door structure according to the first embodiment are denoted by the same numerals and a detailed explanation of them will be omitted from the following description.

In this embodiment, a major portion of the framework is made of metal wires 24a and the rest of the same is made of plate members 24b for reinforcing certain parts of the door trim 20.

The advantages of the vehicular door structure of the present invention as compared with the conventional one will be described in the following.

Since the framework which is light in weight is embedded in the foamed pad member, it is made possible to produce a door trim which is light in weight and which has a satisfactory strength.

By the provision of the foamed pad member, the door trim is made more comfortable for seat occupants and can absorb noise caused by the vehicular body vibration or the like.

Since the supporting brackets fixed to the door panel are directly engaged with the supported portions of the framework, the door structure is made simple and easy to be assembled.

What is claimed is:

1. A vehicular door structure comprising:
    a door panel;
    a door trim which is to be fixed to said door panel, said door trim including a foamed pad member, an outer skin member covering said foamed pad member and a framework, made of metal wire, for reinforcing said door trim, said framework being substantially embedded in said foamed pad member;
    means for fixing said door trim to said door panel; and
    means for defining a notch in said foamed pad member, said notch being positioned away from said outer skin member, said metal wire having a supported portion which is exposed through said notch.

2. A vehicular door structure as claimed in claim 1, in which a major portion of said framework is made of metal wire and the rest of the same is made of a plate member.

3. A vehicular door structure as claimed in claim 1, in which said fixing means comprises a plurality of supporting brackets which are fixed to said door panel, said supported portion of said metal wire being brought into engagement with said supporting brackets in snap action manner, thereby fixing said door trim to said door panel.

4. A vehicular door structure as claimed in claim 3, in which, when said door trim is fixed to said door panel, said supporting brackets are substantially received in said notch.

* * * * *